United States Patent [19]

Shirasu et al.

[11] Patent Number: 4,603,417
[45] Date of Patent: Jul. 29, 1986

[54] PCM CODER AND DECODER

[75] Inventors: Hirotoshi Shirasu, Yokohama; Kazuo Yamakido, Nishitama, both of Japan

[73] Assignee: Hitachi, Ltd., Tokyo, Japan

[21] Appl. No.: 658,912

[22] Filed: Oct. 9, 1984

[51] Int. Cl.⁴ .......................................... H04Q 11/04
[52] U.S. Cl. ..................................................... 370/62
[58] Field of Search ................ 370/62, 58; 179/18 BC

[56] References Cited
U.S. PATENT DOCUMENTS 4,276,639  6/1981  Fukuda et al. ...................... 370/62
4,479,212 10/1984  Albanese ............................. 370/62
4,535,445  8/1985  Lane et al. .......................... 370/62
4,541,087  9/1985  Comstock ........................... 370/62

Primary Examiner—Douglas W. Olms
Attorney, Agent, or Firm—Antonelli, Terry & Wands

[57] ABSTRACT

In order to realize a system in which three or more subscriber parties can hold a conference, and a PCM decoder is also provided with a circuit which adds part of a received digital PCM signal on the input side of the PCM decoder to a PCM signal corresponding to the output of the PCM coder.

9 Claims, 6 Drawing Figures

PCM CODER AND DECODER

BACKGROUND OF THE INVENTION

(1) Field of the Invention

This invention relates to a PCM coder and decoder, a so-called PCM CODEC, and more particularly to a PCM CODEC which has the function that three or more subscriber parties can hold a conference when the PCM CODEC is utilized as a subscriber line interface circuit in an electronic switching system.

(2) Description of the Prior Art

In a PCM telecommunications system, an analog voice signal which is coded into a PCM signal is transmitted to the other party where the PCM signal is decoded into the original analog signal. Accordingly, a PCM CODEC is provided for both the transmitter and the receiver.

In recent years, together with the remarkable progress in semiconductor fabrication processes, PCM CODECs have been realized by LSI circuits, and thus a time-division multiplexing system, a so-called single-channel CODEC system, is mainly employed. In a multiplexing system, an LSI PCM CODEC is provided for each subscriber line in a time-division electronic switching system and a transmission system, and a signal is first converted into a PCM signal at low speed, and the PCM signal is the time-division multiplexed.

In the same way as in conventional methods, this PCM telecommunication is performed with a one-to-one relationship between receiver and transmitter, and PCM telecommunication provided by an LSI single-channel CODEC, whose main purpose is economy, can not achieve a conference of more than this one-to-one ratio, such as a three-party conference. However, it is theoretically possible to achieve a three-party conference with a conventional single-channel CODEC (for example, refer to Japanese Patent Laid-Open No. 73937/1981). The CODEC normally operates so that after the receipt of a synchronizing signal at a period of 8 KHz, a subsequent PCM signal (normally 8-bits long) is received during a predetermined time only, and is then D/A converted to obtain an analog voice signal. Thus it is possible to enable one party of a one-to-one conference to receive the voice of a third party by supplying a synchronizing signal of a coder allotted to a CODEC used by the third party to at least one decoder of the CODECs in the one-to-one conference (i.e., by supplying two synchronizing signals within the 8 KHz period).

However, in this case, in order to provide a three-party conference, it is necessary that the synchronizing signals used for decoding for the first two conference parties are simultaneously supplied to all the CODECs used by the three parties, and that a digital-to-analog converter decoding for each CODEC must operate at least twice as fast. These are conditions for a three-party conference, but when the number of parties is increased to four or more, it is necessary to increase the number of synchronizing signals supplied to each decoder for decoding, according to the number of parties, and simultaneously increase the operating speed of all the decoders. The increase in the number of supplied synchronizing signals increases the complexity of the telecommunication system, also the operating speed of the decoders, so that it is necessary to employ expensive, impractical high-speed elements. This means that in practice it has been impossible to realize a conference with an LSI single-channel CODEC system.

SUMMARY OF THE INVENTION

An object of the present invention is to provide a PCM coder and decoder which can enable a conference with three or more parties, and which can realize a high-performance tele-conference system which does not increase the complexity or cost of the LSI single-channel CODECs and the telecommunication apparatus, in order to solve the above problems.

In order to achieve this object, the PCM coder and decoder of the present invention is characterized by a construction in which, in a PCM coder and decoder whose coder codes an analog voice signal into a PCM signal, and whose decoder decodes a PCM signal into an analog voice signal, an adder for 2 channels of PCM signals is added to digital signal circuits of each of the coder and decoder. The PCM coder and decoder of the present invention is also characterized in that it can realize the formation of a system which has a conference function, by providing a partial addition or substitution of part on a PCM telecommunication system consisting of conventional CODECs which do not have the features of that of the present invention.

Other objects and further features of the present invention will become apparent from the following detailed description, in conjunction with the accompanying drawings.

DETAILED DESCRIPTION

Figure 1:
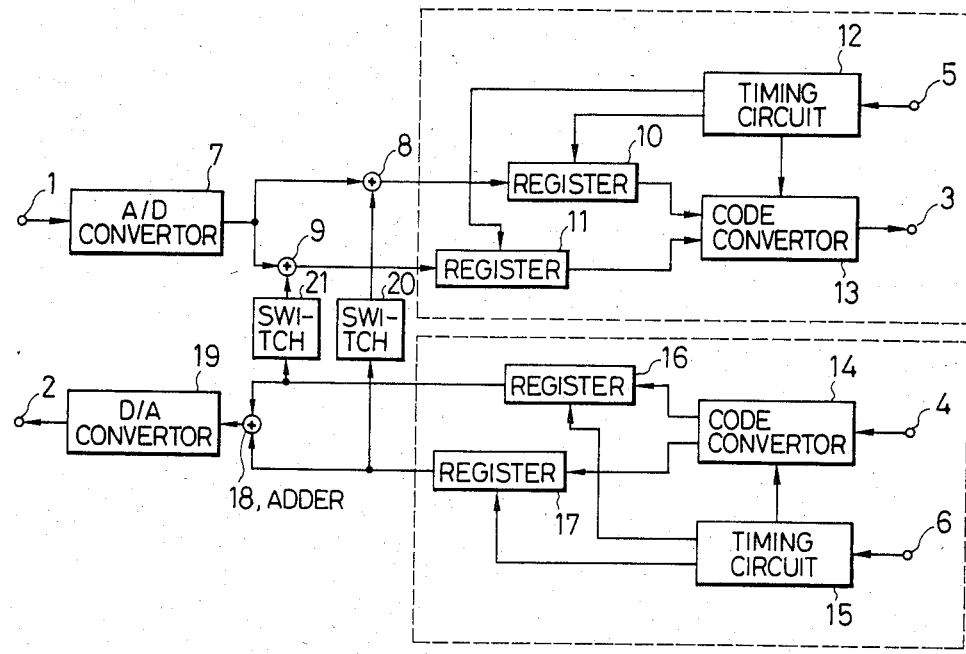
FIG. 1 is a diagram of an embodiment of a PCM CODEC according to the present invention.

FIG. 1 is a block diagram of the construction of one embodiment of the PCM CODEC according to the present invention. In this diagram, an analog signal, such as a voice to be transmitted, is applied to a terminal 1. After the analog signal is converted into a linear PCM signal by an A/D converter 7, it is spatially divided and added to PCM signals of two channels received by digital adders 8 and 9 on a decoder side, and is then stored temporarily in registers 10 and 11. Output control pulses are supplied from a timing circuit 12 to the registers 10 and 11 at a predetermined timing, by a synchronizing signal for the coder which is applied to a terminal 5, and then outputs from the registers 10 and 11 are transmitted to the output terminal 3 in sequence through a code conversion circuit 13.

The registers 10, 11, the timing circuit 12 and the code conversion circuit 13 form an output control circuit which outputs the output PCM signal to external equipment at predetermined timing.

The code conversion circuit 13 is a circuit which converts a linear PCM signal into a nonlinear PCM signal according to A-law or $\mu$-law of the CCIT (International Telegraph Consulatative Committee). The PCM signal transmitted from the output terminal 3 is time-division multiplexed by a transmission bus, and is supplied to an exchange switch (not shown).

On the other hand, on the decoder side, a PCM signal applied to an input terminal 4 is input to a code conversion circuit 14 according to control pulses supplied from a timing circuit 15 during a certain period set by a decoder synchronizing signal applied to a terminal 6, and is then stored temporarily in registers 16 and 17. The registers 16 and 17, the timing circuit 15, and the code conversion circuit 14 form an input control circuit which selects and picks up two signal channels from received PCM signals of a plurality of channels. The code conversion circuit 14 is a circuit which converts nonlinear PCM signals of A-law or μ-law into linear PCM signals, and the input terminal 4 is connected to a reception bus (not shown).

The PCM signals stored in registers 16 and 17 are supplied to a digital adder 18 simultaneously or sequentially at predetermined timing according to the control signal from the timing circuit 15, and the added result is output to a linear D/A converter 19 where it is converted into an analog voltage which is output from terminal 2. The outputs from registers 16 and 17 are also supplied to adders 18 and 19 on the coder side through switch circuits 20 and 21.

When the PCM CODEC of the present invention is employed in a subscriber circuit of a telephone exchange, terminals 1 and 2 are connected to a subscriber's telephone by a transmission line and a reception line of a hybrid circuit.

The above construction differs in the following ways from a conventional PCM CODEC. The circuit between the A/D converter 7 and the code conversion circuit 13, is divided into two lines, and an adder 8 or 9 and a register 10 or 11 are provided in each branch. The circuit between the code conversion circuit 14 and the D/A converter 19 is divided into two lines and a register 16 or 17 is provided in each line, these registers being connected to the adders 8 and 9 by switches 20 and 21, respectively. Signals on the two branch lines are added by the adder 18, and the added signal is then transmitted to the D/A converter 19.

The present PCM CODEC is identical to conventional ones in construction and operation, except for these differences.

In the construction shown in FIG. 1, all the signals consisting of a plurality of bits which are to be input to the adders 8, 9, 18 use a signal format which enables linear computation, it is possible to employ either serial coding or parallel coding as this signal format. In the example shown in FIG. 1, the PCM signal output from the A/D converter is spatially divided into two signals which are each provided with an adder, but it is also possible to time-divide the signal into two signals which are added by a single adder, as will be described later. Concerning the operation of the timing circuits 12 and 15, it is a matter of design as to whether to have a construction in which the timing for outputting the output control signal for the timing circuits is always defined to be a certain time after the timing for inputting the synchronizing signal, or a construction in which the timing therefor can be programmed by hardware or software. Linear PCM signals may be input or output directly without passing through the appropriate code conversion circuits 13 and 14. A conventional CODEC system uses audio-band filters, but in this case these filters can be provided in the front of or behind the A/D converter 7 and D/A converter 19, and it is possible to select the positions thereof as desired.

Figure 2:
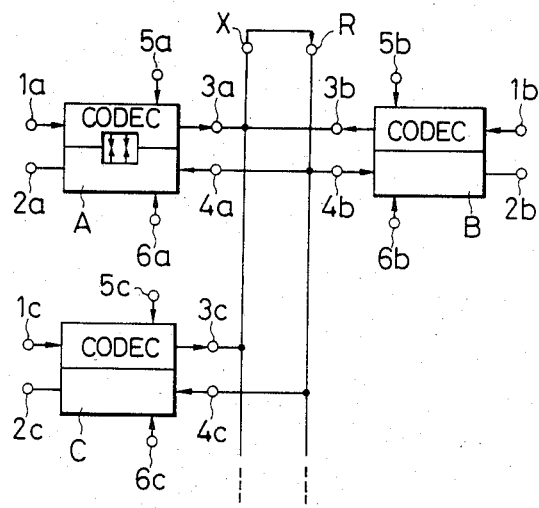
FIG. 2 is a block diagram of the operation of a three-party conference employing the PCM CODEC according to the present invention.

FIG. 2 is a block diagram of a telephone exchange with which a three-party conference is held between a, b, and c, using the PCM CODEC of FIG. 1. In this diagram, numerals 1, 2 . . . 6 denote the same elements as those in FIG. 1, but the suffixes a, b, c are added to these numerals in order to identify the three parties. X denotes a transmission PCM signal bus and R a reception PCM signal bus. Usually, when a telecommunication apparatus or system is enlarged, a plurality of circuits or apparatuses are provided between X and R, however, in order to simplify the explanation, it is assumed here that X and R are directly connected to each other on one side.

The connections of timing signal input terminals 5a, 5b, 5c and 6a, 6b, 6c are not shown, but it goes without saying that a timing signal corresponding to the telephone timing signal is applied to these terminals from a common control circuit.

In FIG. 2, only CODEC A of the PCM CODECs A, B, C corresponding to Parties a, b, c is the CODEC of FIG. 1 and CODECs B, C are conventional CODECs which do not have the adder circuits 8, 9, 18 and the switches, etc., of FIG. 1, but it is obvious from the above description that CODECs B and C could also be CODECs as shown in FIG. 1. In other words, a telecommunication apparatus or system consisting of only conventional CODECs can enable a multiparty conference by the addition or substitution of the CODEC of the present invention for one part of the apparatus or system.

Figure 3:
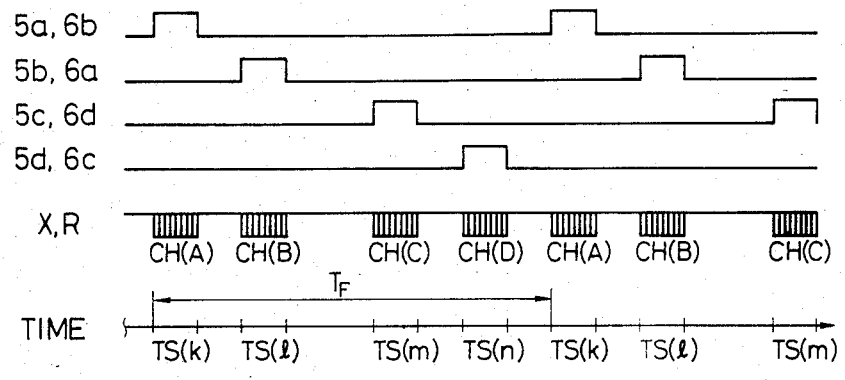
FIGS. 3 and 4 are timing charts of the operation of the CODEC of FIG. 2
Figure 4:
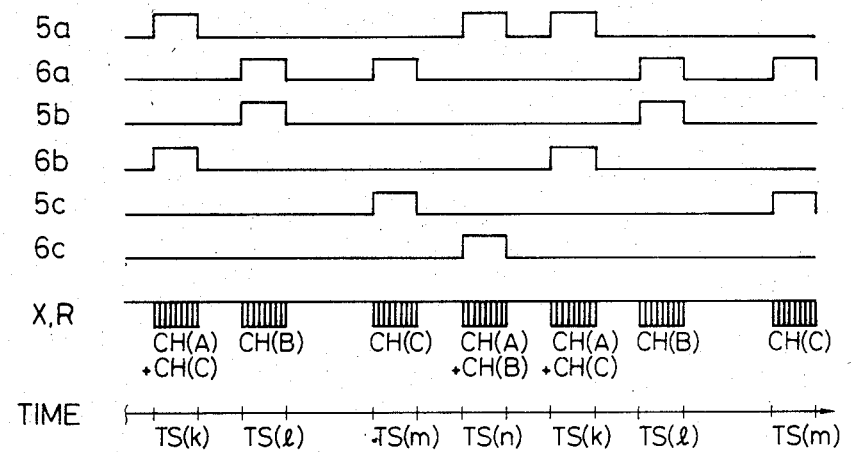

FIG. 3 and 4 are timing charts of the operations of a one-to-one conference and three-party conference, respectively.

FIG. 3 shows the synchronizing signal and the PCM signal of each CODEC when Parties a and b are holding a one-to-one conference with CODECs A and B of FIG. 2, and the notation down the left side corresponds to the numerals in FIG. 2. CH(A), CH(B), etc., denote output PCM channels of Parties a, b, etc.

In FIG. 3, since a third party c is holding a one-to-one conference with a fourth party d (not shown in FIG. 2), PCM signals for each of the parties CH(A), CH(B), CH(C), and CH(D), as shown in FIG. 3(X, R), are on the PCM signal buses X and R.

In order to simplify the description, the synchronizing signals supplied to terminals 5 and 6 of each CODEC are assumed to directly control the input and output of PCM signals by themselves. Thus, a PCM output signal from Party a is output at a location which is periodically the same as the synchronizing signal applied to terminal 5a in FIG. 2, that is, at the timing of a time slot TS(k) of FIG. 3. Similarly, a PCM output signal from Party b is output in a time slot TS(l). If time slot TS(l) is allocated to terminal 6a for the decoder synchronizing signal of CODEC A and, conversely, time slot (TS(k) is allocated to terminal 6b of CODEC B, a one-to-one conference can be held between Parties a and b. In this case, since one of the time slots TS(k) and TS(l) is allocated to each of the terminals 5a and 6a, for example, nothing is stored in registers 11 and 17 of FIG. 1, the content of register 10 is the PCM signal for only Party a, and that of register 16 is the PCM signal for Party b. For the third party c and the fourth party d, similarly, a time slot TS(m) is allocated to terminal 5c for the decoder synchronizing signal of CODEC C, and a time slot TS(n) is allocated to terminal 5d of CODEC D, and, conversely, time slot TS(n) is allocated to terminal 6c of CODEC C and time slot TS(m) is allocated to terminal 6d of CODEC D.

Conventional CODECs could be used by the third party c and the fourth party d.

The operation of a three-party conference will now be described on the basis of FIG. 4. It is assumed that, during a one-to-one conference between Parties a and b, a third party breaks in.

The time slot TS(l) has been supplied to the decoder synchronizing signal (terminal 6a) of CODEC A, but when Party c breaks in on Party a, the coder synchronizing signal of Party c (the signal in time slot TS(m) applied to terminal 5c) is added to the signal in time slot TS(l) and is applied to terminal 6a (the logical or of them is supplied). The control circuit which provides this control is not shown in the drawings, but it transmits the pulse in the time slot in synchronization with the master clock, as a synchronizing signal for each of CODECs A, B, C, by well-known techniques.

Exactly the same function is provided for terminal 5a, but, in this case, in addition to the existing time slot TS(k), the synchronizing signal in time slot TS(n) supplied to terminal 6c of CODEC C is added, as shown in (5a) of FIG. 4 (the logical or of them is supplied).

Accordingly, in FIG. 1, when the inputs of registers 16 and 17 are constructed so as to be controlled by TS(l) and TS(m), respectively, the output PCM signal CH9B) from Party b and the output PCM signal CH(C) from Party c are stored in register 16, and register 17, respectively, 17 during predetermined periods. More specifically, this function can be provided by transmitting the pulses from the timing circuit 15 to the registers 16, 17 in time slots TS(l) and TS(m), and latching the PCM signals in these time slots. The pulses in time slots TS(l), TS(m) are transmitted from the timing circuit 15 to the code conversion circuit 14, and the PCM signal is input to the circuit 14 in these time slots so as to convert the signal.

When there are outputs from the registers 16, 17, the sum of the two outputs is converted into an analog signal by the D/A converter 19, so that Party a can simultaneously receive channel signals CH(B)+CH(C) corresponding to the voices of Party b and the interrupting Party c. In this case, the D/A converter 19 is merely required to provide digital-to-analog conversion of one composite signal added in a digital manner, without any special treatment, so it is not necessary to operate it two or more times faster, as in a conventional CODEC.

On the other hand, the content of register 16, that is, the PCM signal CH(B) of Party b, is stored in the register 11 through the switch 21 and the adder 9. Accordingly, the content of register 11 is the composite signal CH(A)+CH(B) from Party a and Party b. Similarly, the content of register 17 is stored in register 10 through the switch 20 and the adder 8, so that the content of register 10 is the composite signal CH(A)+CH(C) from Party a and the interrupting Party c.

The signals on the PCM signal buses (X and R), as shown in FIG. 4 (X, R), are the composite of CH(A)+CH(C) in time slot TS(k), CH(B) alone in time slot TS(l), and the composite of CH(A) +CH(B) in time slot TS(n). In this case, the signals on the PCM signal bus are composites of two parties, particularly in time slots TS(k) and TS(n), so it is not particularly necessary to employ the CODEC of the present invention described above in detail as CODECS B and C for receiving these signals, and it is possible to employ conventional CODECs.

In this case, if the amplitude of the composite signal produced by adding the PCM signals of CH(A) and CH(B) is high and exceeds the amplitude saturation level of the A/D and D/A converters 7 and 19, it is necessary to transmit an audio output equal to the saturation level at first, store the value of the difference between the audio output at the saturation level and the actual audio output, and substract the stored difference from a subsequently-received audio output at saturation level. This makes it possible to hold a conference.

In a three-party conference as described above, when it is not necessary to enable the party using CH(B) to hear the voice of the interrupting party on CH(C), or enable the interrupting party on CH(C) to hear the voice of the party on CH(B), switches 20 or 21 in FIG. 1 can be turned off.

In this embodiment, a three-party conference is described, but when the number of conference parties is four or more, CODECs of the present invention should be utilized as at least two (the total number of conference parties minus 2) CODECs. For example, when a four-party conference is held, CODECs of the present invention are employed for CODEC B or C in FIG. 2 to enable a three-party conference, and CODEC D of the fourth party can interrupt either Party b or c through CODEC B or C.

Figure 5:
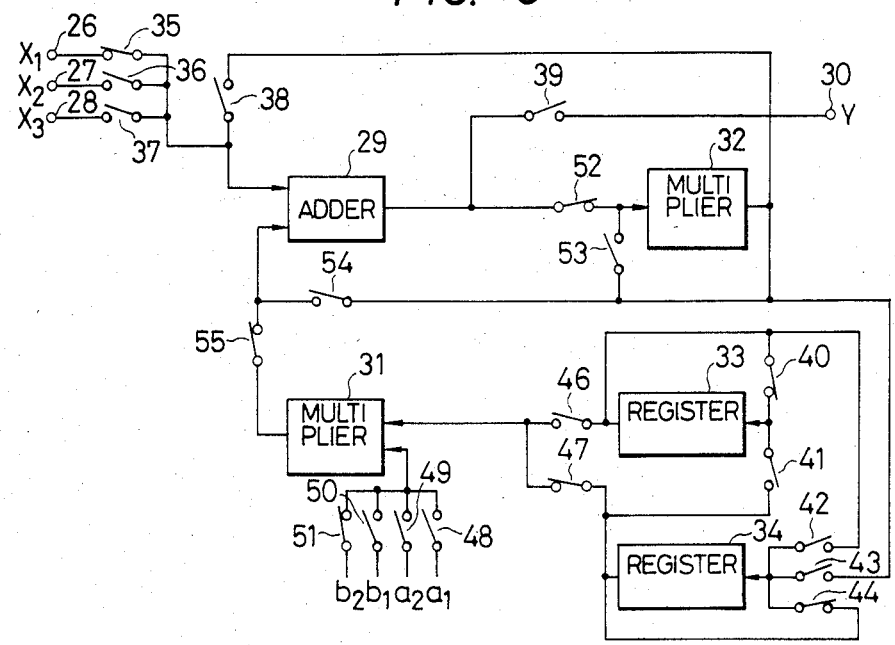
FIG. 5 is a circuit diagram of one embodiment of the digital filter used in the PCM CODEC of the present invention.

FIG. 5 shows the construction of one embodiment of an adder circuit (adders 8, 9 of FIG. 1) which adds a signal on the decoder side of a CODEC to a signal on the coder side. In particular, a high-pass filter provided on the output side of the A/D converter circuit consists of a digital filter, in order to enable the function of an adder circuit simultaneously with the function of a digital filter. The operation of the circuit in FIG. 5 is described on the basis of the timing chart of FIG. 6.

An output $X_1$ from the A/D converter circuit of FIG. 1 and outputs $X_2$ and $X_3$ from the switch circuits in FIG. 1 are added to input terminals 26, 27, and 28, respectively. An output from an output terminal 30 is divided into two by a serial-and-parallel converter circuit (not shown), and these are supplied to registers 10 and 11 of FIG. 1.

The digital filter is driven by a clock signal of a much higher frequency than the signal-sampling frequency $f_s$ (=8 KHz), so that a fundamental period ($1/f_s$) is divided into a plurality of steps. Steps 1 to 4 of the fundamental period govern the operating period of the high-pass filter, and steps 5 and 6 govern the operating period of the adder circuit.

Figure 6:
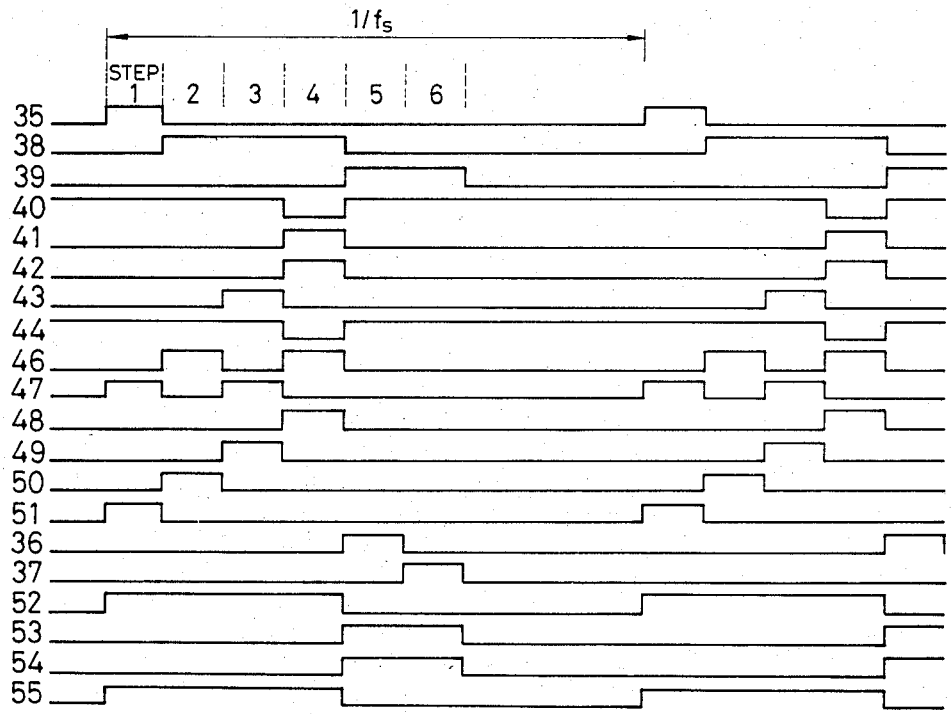
FIG. 6 is a timing chart of the operation of the digital filter of FIG. 5.

Switches 35 to 44, 46 to 55 can be turned on or off, as shown in FIG. 6. When a signal is at high level (H), the corresponding switch is on, and when the signal is at low level, it is off.

In the first step each switch is as shown in the diagram. Data $R_2$ (1) of a register 34 is multipled by a multiplicator $b_2$ in a multiplier to obtain $b_2 \times R_2(1)$, and this is added to the input $X_1(1)$ by an adder 29 and is then input to a register 32 as $W_1(1)$. Simultaneously, since the content of a register 34 is held, the relationship $R_2(1)=R_2(2)$ is established. The figures in parenthesis denote the steps in this process.

In the second step, $R_1(2)$ in register 33 is multiplied by a multiplicator $b_1$ in a multiplier 31, and is added to data $W_1(1)$ in register 32 by the adder 29. The value $W_1(1)+b_1 \times R_1(2)$ is stored in register 32 as $W_1(2)$, while register 33 holds $R_1(2)$.

In the third step, the data $R_2$ in register 34 is multipled by a multiplicator $a_2$ and is added to data $W_1(2)$ in register 32 by the adder 29. The value $W_1(3)=W_1(2)+a_2\times R_2$ is stored in register 32, and simultaneously data $W_1(2)$ is register 32 is stored in register 34.

In the fourth step, which is the last step of the filter operation, data $R_1$ in register 33 is multiplied by a $a_1$ in the multipier 31 and is added to data $W_1(3)$ in register 32 by the adder 29. The value of $W_1(4)=W_1(3)+a_1\times R_1$ is stored in register 32, and simultaneously data $R_1$ in register 33 is replaced with data $R_2$ from register 34 (that is, $W_1(2)$).

The operational result $W_1(2)$ computed as far as the second step, is equal to $W(n)$, with respect to input sampling data $X_1(n)$, and data $R_1$ in register 33 and data $R_2$ in register 34 are equal to $W_1(2)$ of the previous input sampling data and $W_1(2)$ of the input sampling before that, respectively, so that the relationships $R=W(n-1)$ and $R_2=W(n-2)$ are established. Accordingly, $W(n)$ is expressed by the formula:

$$X_1(n)+b_1\times W(n-1)+b_2\times W(n-2)=W(n) \qquad (1)$$

The operational result $W_1(4)$ of the fourth step is output as an output signal $Y(n)$ from the output terminal 30. $Y(n)$ is expressed by the formula:

$$W(n)+a_1\times W(n-1)+a_2\times W(n-2)=Y(n) \qquad 1$$

Data $R_1$ and $R_2$ in each register 33 and 34 correspond to $W(n)$ and $W(n-1)$, respectively, which shows that registers 33 and 34 operate as delay registers.

When the function z expresses the transfer function H of the filter using Formulas (1) and (2), because $W(n-m)$ is expressed as $Z^{-m}\cdot X(z)$, function H is expressed by the formula:

$$H(z) = \frac{Y(z)}{X(z)} = \frac{Z^0 + a_1xZ^{-1} + a_2xZ^{-2}}{Z_o - b_1xZ^{-1} - b_2xZ^{-2}}$$

Thus, this filter has the characteristic of a cyclic digital filter and can realize various different filtering characteristics by defining different coefficients.

In the fifth step, after the completion of the operating function of the high-pass filter, switches 39, 40, 44, 36, 53, 54 are turned on and the other switches are turned off. Thus, the content of register 32 is transmitted through switch 54 to the adder 29, where it is added to data $X_2$(the signal from Parts b) passed from the input terminal 27 through switch 36. The added result is output as an output signal from terminal 30 through switch 39, and this signal is transmitted to the code conversion circuit 13 of FIG. 1.

Simultaneously, the output of register 32 is again input through switch 53 and is held.

In the sixth step, switch 36 is turned off and switch 37 is turned on. The other switches are in the same state as in the fifth step. Accordingly, following the same procedure as that of the fifth step, $X_1+X_3$ (the signals of CH(A)+CH(C)), produced by adding signal $X_3$ (the signal from Party C) from output terminal 28 to signal $X_1$ (the signal from Party a) held by register 32 in the fifth step, is output from the output terminal 30.

The above description concerned a three-party conference, however an ordinary two-party conference can be provided by making sure that signals $X_2$ and $X_3$ to at zero level. The embodiment disclosed above concerned serial transmission of data, but it is possible to provide parallel transmission of the data. In this case, the switches 40, 44, 53 can be omitted.

We claim:

1. A PCM CODEC comprises: a PCM coder converting an input analog signal into a first PCM digital PCM signal, and outputting the PCM signal at a predetermined timing, a PCM decoder receiving digital PCM signals from two channels of a plurality of time-division multiplex channels, and decoding a composite signal of said signals of said two channels into an output analog signal, and an adder circuit adding said signals of said two channels to said first digital PCM signal.

2. The PCM CODEC according to claim 1, wherein said PCM coder includes a A/D converter converting said input analog signal into a linear PCM signal, a first register storing outputs of said adder circuit during a predetermined time, and an output control circuit reading out said two added signals stored in said first register at predetermined timing; and said PCM decoder includes an input control circuit picking up said PCM signals of said two channels of said plurality of time-division multiplex channels, a second register storing said signals of said two channels picked up by said input control circuit, and a D/A converter converting an input of a composite signal produced by signals read out from said second register into an analog signal.

3. The PCM CODEC according to claim 2, wherein said adder circuit consists of first and the second adder circuits which add two first digital signals produced by spatially-dividing an output of said A/D converter into two lines to two PCM signals read out from said second register at individual timing.

4. The PCM CODEC according to claim 2, wherein said adder circuit adds said PCM signals from said two channels read out at individual timings from said second register to said first digital PCM signal output from said A/D converter circuit, at different timings.

5. The PCM CODEC according to claim 4, which further comprises a recursive digital filter between said A/D converter and said first register, and wherein said adder circuit is constructed to utilize, as a time-division element, an adder included in said digital filter.

6. The PCM CODEC according to claim 2, wherein said output control circuit includes a code conversion circuit converting said two added signals read out from said first register into a non-linear PCM signal compressed in accordance with either A-law or $\mu$-law, and said input control circuit includes a code conversion circuit converting a non-linear PCM signal compressed in accordance with either A-law or $\mu$-law, and corresponding to said plurality of time-division multiplex channel signals, into a linear PCM signal.

7. The PCM CODEC according to claim 6, wherein said adder circuit consists of first and second adders for adding two first digital signals produced by spatially-dividing an output of said A/D converter circuit into two lines to said two PCM signals read out from said second register at individual timings.

8. The PCM CODEC according to claim 6, wherein said adder circuit adds each of said PCM signals of said two channels read out from said second register at individual timings to said first digital PCM signal output from said A/D converter, at different timing.

9. The PCM CODEC according to claim 8, which further comprises a recursive digital filter between said A/D converter and said first register, and wherein said adder circuit is constructed to utilize, as a time-division element, an adder included in said digital filter.

* * * * *